United States Patent Office 3,125,553
Patented Mar. 17, 1964

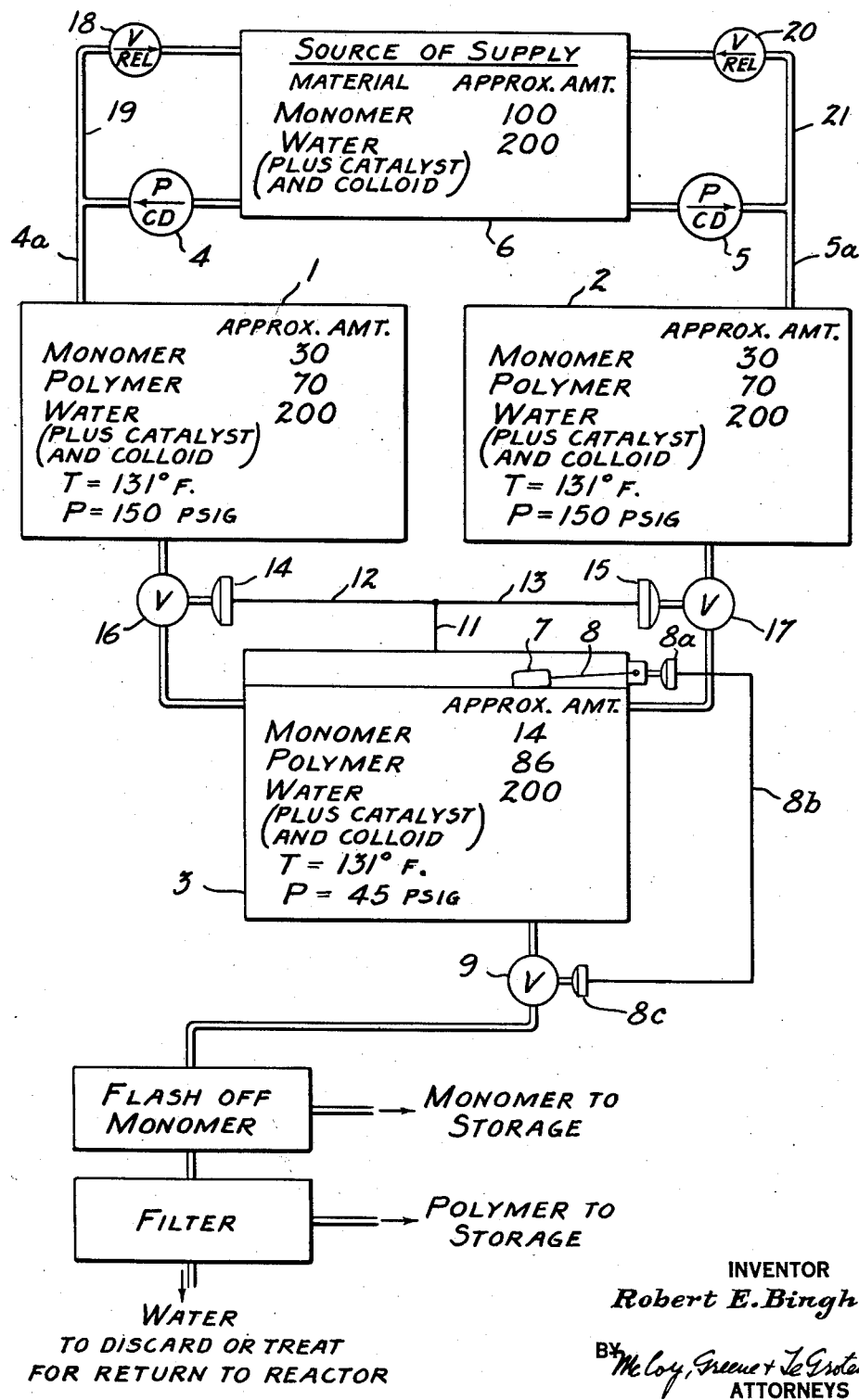

3,125,553
CONTINUOUS POLYMERIZATION PROCESS FOR VINYL MONOMERS
Robert E. Bingham, Cuyahoga Falls, Ohio, assignor to The General Tire & Rubber Company, Akron, Ohio, a corporation of Ohio
Filed June 22, 1960, Ser. No. 37,989
10 Claims. (Cl. 260—87.1)

This invention relates to a system for the suspension polymerization of unsaturated monomers. More particularly, the present invention relates to a continuous method for the suspension polymerization of vinyl halide type monomers to obtain high yields.

The suspension polymerization of polyinvyl chloride is normally conducted as a batch operation in autoclaves or pressure reaction vessels. The monomer mixture including water, catalyst and protective colloid is charged to the reactor and polymerization proceeds at about 120–150° F. for a number of hours until a pressure drop is observed which represents about 70% conversion. While polymerization can continue up to a theoretical 100%, the percent rate of conversion per hour decreases rapidly after 70% conversion so that it is not practical to carry the polymerization beyond about 90% conversion. However, up to 70% conversion the rate of polymerization increases continuously with extent of conversion reaching a maximum at about 70% conversion. This type of polymerization is in marked contrast to the emulsion polymerization of GRS (SBR) rubber. In such processes the rate of conversion is about 10% per hour for cold GRS and 6% per hour for hot GRS and this rate is maintained up until the desired conversion is obtained. It would be highly desirable to provide a process in which vinyl halide type monomers may be suspension polymerized at the peak rate of conversion in order to increase productivity. Accordingly, it is a primary object of the present invention to provide a method for continously suspension polymerizing unsaturated monomers to obtain high yields of polymeric materials at the peak rate of reaction.

It is another object of the present invention to provide a method for continuously suspension polymerizing vinyl chloride monomers at increased rates of conversion to obtain polyvinyl chloride in high yields.

A further object is to provide a method for the aqueous suspension polymerization of vinyl chloride type monomers and comonomers in the presence of previously formed polymers to obtain polymeric substances in high yields.

A still further object is to provide a system for the continuous aqueous suspension polymerization of polymerizable unsaturated monomers.

These and other objects and advantages of the present invention will become more apparent to those skilled in the art from the following detailed description, examples and drawing which is a flow sheet illustrating a method and an arrangement of apparatus for use in practicing the present invention.

It has been discovered according to the present invention that unsaturated monomers such as vinyl halide type monomers can be suspension polymerized to a high yield by removing, after substantial polymerization has occurred, part of the reaction mixture containing polymer, monomer, water, residues of the catalyst and colloid etc. and replacing it with a substantially equal amount of a mixture containing the monomer and being substantially the same as the initial mixture. The reaction mixture then can be polymerized further and portions withdrawn and replaced with fresh monomer mixture from time to time. The individual polymerization steps can be carried up to about 70% conversion which is normally determined by a pressure drop in the reaction system at which point a slurry of the polymer including unpolymerized monomer, water etc. is withdrawn and replaced with fresh monomer mixture. When operating in this fashion, it is possible to double the rate of conversion of monomer to polymer as compared to a batch process. The steps of introducing monomer mixture, withdrawing polymer mixture and carrying out the polymerization can be carried out simultaneously or continuously. Thus, the method of the present invention provides a high or increasing rate of polymerization by continuously withdrawing polymer slurry while simultaneously feeding in sufficient charge ingredients to maintain an essentially constant composition in the reactor. The polymerization process need only be stopped to repair equipment or to clean the reactor and agitator where films may deposit on the wall of the reactor, on the agitator etc. In many instances it is desirable to add to the monomer mixture introduced into the reactor small amounts of polymers or copolymers, preferably finely divided, in which the monomer units may be the same or different from those which are being polymerized. The introduction of finely divided polymeric material with the monomer helps to control the particle size of the polymer obtained. It, also, provides a method for forming graft polymers or mixed polymers.

Monomers to be suspension polymerized can be any polymerizable monomer including mxitures of monomers in which the monomer has from 1 to 3 $CH_2=C<$groups, in which the polymer from the monomer is insoluble or essentially insoluble in the monomer, and in which the monomer exhibits an increase in the rate of polymerization with an increase in the extent of conversion of monomer to polymer. Examples of useful monomers are vinyl fluoride, vinyl chloride, vinyl bromide, vinylidene fluoride, vinylidene chloride, vinylidene bromide, vinylidene cyanide, divinyl benzene, divinyl naphthalene, diallyl phthalate, diallyl malonate, diallyl malate, diallyl phthalate, divinyl ether, gycol diacrylate (ethylene diacrylate), glycol dimethacrylate, diallyl ether, glyceryl triacrylate, glyceryl trimethacrylate, trivinyl benzene, acrylonitrile, methacrylonitrile, chloroacrylonitrile and the like and mixtures thereof. One or more of the foregoing monomers, also, can be copolymerized with one or more monomers, in minor molar amounts, such as vinyl acetate, methyl acrylate, ethyl acrylate, methyl methacrylate, ethyl methacrylate, ethyl hexyl acrylate, allyl acrylate, allylalphaphenyl acrylate, styrene, methyl styrene, chlorostyrene, allyl alcohol, 3-butene-1-ol, phenyl vinyl ether, allyl acetone, trichlorofluoro-ethylene, isobutylene and the like. Monomers which are preferred comprise vinyl chloride, vinyl fluoride, vinyl bromide, vinylidene chloride, vinylidene fluoride, vinyl acetate, acrylonitrile and vinylidene cyanide and mixtures thereof, or mixtures of one or more of these monomers and a minor amount of a copolymerizable monomer other than these monomers such as one of the other monomers mentioned above. Even more preferred are polymers prepared from vinyl chloride, or a major amount by weight of vinyl chloride and a minor amount by weight of vinyl acetate, for example, a polymer containing from about 86 to 98% by weight of vinyl chloride and from about 14 to 2% by weight of vinyl acetate.

In suspension polymerization, the polymerizable monomers are charged to the reactor and polymerized in the presence of a large volume of water which preferably is deionized. In general, there is used about 1 part by weight of the monomer or monomer mixture to 2 to 3 parts of water, although these amounts can be varied somewhat. A colloid is added to the reaction medium at the time the monomer is added or whenever convenient before polymerization. Catalysts are used in the reaction and can be any catalyst which will effect polymerization, such as lauroyl peroxide, hydrogen peroxide and the like and mixtures thereof. Minor amounts of chain transfer agents or buffers can be added if desired. Examples of such agents are sodium bicarbonate, lead stearate, calcium stearate, carbon tetrachloride, ethylene dichloride, ethylene trichloride (which is preferred) and the like. Heat is applied as necessary to start or maintain the reaction. It can be obtained by heating the water first and pumping it to the reactor so that the polymerization mixture initially has a temperature of about 120 to 140° F. It is preferred to stir or agitate the mixture during polymerization to obtain the best particle size. If desired, a polymerization can be short-stopped prior to completion by adding a short-stopping agent such as diisopropyl benzene monohydroperoxide, tertiary butyl hydroperoxide, dimazine and so forth.

Protective colloids having little surface activity are generally used in suspension polymerization to provide finely divided particles suspended in the aqueous medium. Examples of useful protective colloids are copolymers of from 30 to 50% vinyl acetate, balance 1-vinyl-2-pyrrolidone. Other copolymers can be used as a colloid such as those obtained by copolymerizing a pyrrolidone, such as 1-vinyl-3-pyrrolidone, or piperidone, with a copolymerizing monomer such as vinyl acetate, acrylic acid, methacrylic acid, butyl acrylate, ethyl acrylate, methyl acrylate, ethyl vinyl ketone, allyl acetone (5-hexane-2-one), methyl vinyl ether, vinyl isobutyl ether, allyl alcohol, 3-buten-1-ol, and the like and mixtures thereof. Still other protective colloids may be used such as gelatin, polyacrylamide, hydroxy ethyl cellulose, carboxy methyl cellulose, methyl cellulose, gum arabic, gum tragacanth, low molecular weight polyvinyl alcohols etc. These protective colloids are used in amounts of from about 0.01 to 4.0% by weight, and preferably from about 0.1 to 2% by weight, based on the weight of the polymer obtained. The catalyst may be used in an amount of from about 0.05 to 2.0% by weight based on the weight of the polymer obtained.

It is very desirable to add to the monomer mixture, when it is introduced to the reaction vessel either initially or at the time of subsequent additions, from about 10 to 20% by weight of the monomer present of particles of finely divided water insoluble polymers or copolymers. It is desirable that these polymeric materials have a particle size in which about 50% by weight pass a 200 mesh U.S.S. screen and about 50% are retained on a 200 mesh U.S.S. screen. The polymer can be readily mixed with the monomer to form a slurry which is then pumped or otherwise delivered to the reactor or the polymer particles can be added with the other ingredients or separately. The polymeric materials can be polymers of the monomer or monomer mixtures disclosed above, or can be other resinous or rubbery finely divided water insoluble polymeric materials, such as the high styrene-butadiene copolymers, polystyrene, copolymers of styrene and acrylonitrile, polyethylene, polytetrafluoroethylene, nylon or polyamides, phenol-formaldehyde compounds, polymethylmethacrylate resins and other resinous materials in finely divided form. In some instances the monomer will be soluble in the polymeric material and may form a polymeric graft or be attached otherwise to the polymeric nucleus so that it is not readily separated or distinguishable therefrom. In other instances the monomer(s) will form a polymer on the surface of the dissimilar polymeric particles so that there is obtained a nucleus of one type of polymeric material with a coating or covering of a different type of polymeric material. Another method of conducting polymerization is to carry out the suspension polymerization of one type of vinyl halide monomer or monomeric substance and then gradually add in subsequent charges a different vinyl halide monomer to obtain a somewhat heterogenous mixed polymerizate.

In carrying out the method of this invention the monomer, such as vinyl chloride, in an amount of about 5 to 50% by weight, the balance being water, preferably in proportion of about 25–50% monomer and 75–50% water, plus minor amounts of catalyst and colloid are introduced into a reactor. The water may be heated to initiate the reaction or the reactor may be heated. Since the reaction is generally exothermic, the reactor can subsequently be cooled during polymerization. As polymerization starts the pressure remains constant until a conversion of about 70% is obtained at which time the pressure drops and a slurry or dispersion of polymer, monomer, water, catalyst or catalyst residues, colloid etc., is withdrawn and an equivalent amount by weight or a substantially equivalent amount by weight of fresh monomeric mixture is introduced into the reactor. The amount by weight of fresh monomer added should be substantially, preferably essentially, equal to the total weight of polymer and monomer withdrawn from the reactor. It is preferred that the conversion be carried to from about 55 up to 70% (to obtain highest yields per reaction time) before part of the reaction mixture is withdrawn. More preferably, conversions are carried up to about 60% to obtain maximum yields consistent with obtaining a uniform, fine particle size. Moreover, withdraw of part of the reaction media can occur at conversions of from about 40 to 60% if desired to form a blotter type resin by sudden release of pressure on a portion of the reaction mixture withdrawn. The amount of polymer mixture withdrawn from the reactor can be from about 1 to 60%, preferably from about 1 to 30%, by weight of the mixture in the reactor. The temperature of the reactor may vary over a wide range although in general the temperature will be from about 120 to 150° F. and preferably is about 131° F. The overall pressure in the reactor will depend upon the temperature until the pressure drops indicating that about 70% of the monomer has been converted to polymer and usually will be in the range of from about 90 to 160 p.s.i.g. During polymerization the pressure remains constant up to about 70% conversion, and then it drops continuously until the reaction is stopped.

With the method of the present invention it is possible to polymerize at the highest rate of conversion which occurs when about 70% of the monomer, such as vinyl chloride, has been converted to polymer. In the reactor, the reaction mixture will contain about 70 parts polymer and 30 parts monomer. The reaction mixture is then withdrawn continuously and it will contain a 70/30 polymer-monomer mixture in water. Simultaneously, there is continually added to the reactor a fresh aqueous monomer mixture substantially equal in composition to the original monomeric mixture and in which the amount of monomer is essentially equal to the amount of polymer and monomer in the polymeric mixture withdrawn. As soon as fresh monomer is added to the reactor, it starts polymerizing at a rapid rate so that shortly there is approximately a 70/30 polymer-monomer mixture in the reactor. Thus, in effect there is in the reactor substantially at all times a mixture of about 70% polymer and 30% monomer and the reactor is at substantially constant temperature and pressure. The system is operating at the maximum conversion rate and hence the yield of polymer per unit of time is very high. With such a 70/30 system the same number of pounds of polymer are being withdrawn per hour from the reactor as are being made per hour in the reactor. For one system at 70/30, 10% of polymer per hour can be produced.

However, as pointed out herein the polymerization process can be operated at other conversion rates, for example from about 40 to 90%, following the same general method of withdrawing polymer mixture and adding fresh monomer mixture. For example, blotter resins are obtained at about 50% conversion when the resin particles are somewhat swollen with, or contain a large amount of absorbed, monomer. As fresh monomer mixture is continuously added, the reaction mixture containing 50/50 polymer-monomer mixture can then be withdrawn continuously. If the pressure is then suddenly released on the monomer swollen resin particles, the vaporized monomer causes the resin particles to expand, blow or form numerous interstices or pores. With one system running at 50% conversion, about 8% of polymer per hour can be produced. While it is preferable to simultaneously add monomer mixture and withdraw polymer mixture from the reaction zone, these steps can be delayed or follow each other at different times.

The slurry of monomer, polymer, water and any residual catalyst and colloid can be treated to flash off or vaporize the monomer, which can be returned to the process or sent to storage. The water-polymer slurry can then be filtered and the polymer collected and stored. The water can be discarded or treated and returned to the reactor. It is preferred that deionized water be used for polymerization. Thus, the water should be deionized if necessary prior to recirculation to the reactor. If the monomer-polymer-water slurry is withdrawn from the reactor under pressure and the pressure is slowly released, a substantial amount of the monomer will vaporize somewhat slowly, leaving relatively nonporous polymer particles, particularly at about 70% conversion. However, if it is desired to obtain a blotter type resin, that is a resin which has a high permanent liquid plasticizer take-up, the pressure can be released suddenly on the mixture at about 50% conversion to cause the residual monomer to vaporize quickly to cause the polymer particles to blow or puff up or form somewhat porous materials which will absorb substantial amounts of plasticizer.

The polymers obtained according to the method of the present invention, particularly the resinous polymers, can be plasticized with well known plasticizers such as dioctyl phthalate, tricresyl phosphate, the non-migratory polyester plasticizers and others well known to the art. Stabilizers, antidegradants, such as antiozonants and antioxidants, fillers, extenders, other rubbers and resins, pigments, dyes, fungicides, fire resistant materials, curing agents (where unsaturation is present), and other compounding ingredients can be mixed and blended with these polymers as is known to the art. The resulting polymers can be dissolved in solvents and used for can coatings, can be used as coatings on fiber or cardboard boxes, and so forth. They can be made into supported or unsupported films, sheets and the like for use in making upholstery materials for furniture, and for the interior of automobiles, shower curtains, decorative wrappings, wall coverings, pressure sensitive adhesive tapes, and so forth. They can also be used in the manufacture of floor tile, shoe uppers, phonograph records, toys and the like.

The following examples will serve to illustrate the invention with more particularity to those skilled in the art:

EXAMPLE I

A mixture of 5,000 grams of vinyl chloride, 10,000 grams of deionized water, 15 grams of lauroyl peroxide and 15 grams of polyvinyl alcohol (Elvanol 50–42, made by E. I. du Pont de Nemours and Co.) as the protective colloid, were charged to a 5 gallon autoclave. It is preferred to mix the catalyst with the vinyl chloride first and the colloid with the water, which is then added to the reactor. The vinyl chloride is pressurized with nitrogen from a supply tank to the reactor. The autoclave was equipped with a marine type impeller operating at 450 r.p.m. and the temperature of the reactor was about 131° F. The pressure rose rapidly to 130 p.s.i.g. (117 p.s.i.g. without nitrogen) where it remained about constant. Polymerization was conducted for 9 hours when the pressure dropped 25 p.s.i.g. (about 70% conversion) whereupon 3,000 grams of a slurry of polyvinyl chloride, vinyl chloride monomer, water, residual catalyst and colloid were withdrawn and a fresh mixture (3000 grams) of water, vinyl chloride monomer, lauroyl peroxide and polyvinyl alcohol colloid, in the ratios indicated above, was charged to the reactor. The charge was polymerized until a second pressure drop (of about 20 p.s.i.g. were observed) when 3,000 grams of reaction slurry was withdrawn and a fresh charge of 3,000 grams of the monomer mixture was added to the reactor. These steps were repeated for six more successive pressure drops of from about 20 to 40 p.s.i.g. After the eighth withdrawal of polymer slurry, the reactor was allowed to continue for about 1¾ hours when the entire batch was withdrawn from the reactor. From each batch of material, samples of polymer were taken, dried and weighed and the particle sizes and viscosities of the polymers obtained were determined. In the table below are shown the amount of dried polymer obtained from each batch at the time of discharge, the wet sieve analysis and the viscosity of the polymer of each batch.

*Table*

PROPERTIES OF CONTINUOUS POLYMERIZATION SAMPLES

| Sample | Wt. of Dried Polymer (gm.) | Time Discharged (hrs.) | Wet Sieve Analysis (USS Screen) | | | | |
|---|---|---|---|---|---|---|---|
| | | | On | | | Thru | |
| | | | 40 | 100 | 200 | 200 | ($\eta$) |
| A | 753 | 9th hr. | 3 | 68 | 13 | 16 | 0.99 |
| B | 778 | 9½ | 4 | 73 | 12 | 11 | |
| C | 1,388 | 10 | 4 | 69 | 13 | 14 | 1.04 |
| D | 783 | 11¼ | 5 | 71 | 13 | 11 | |
| E | 729 | 12 | 9 | 72 | 9 | 10 | 1.08 |
| F | 710 | 13½ | 14 | 60 | 13 | 13 | |
| G | 753 | 14¼ | 16 | 56 | 11 | 17 | 1.05 |
| H | 783 | 16¼ | 22 | 54 | 11 | 13 | 1.07 |
| I | ¹ 3,713 | 18 | 30 | 47 | 9 | 14 | 1.06 |

$\eta$=Intrinsic viscosity in cyclohexanone at about 25° C.
¹ Remainder of batch withdrawn.

The second column of the table shows the weight of the dried polymer from each fraction and includes the weight of the polymer remaining in the autoclave at the completion of the experiment. The first addition and withdrawal was made at 9 hours. The last withdrawal was made at 18 hours. Therefore, the experiment approximated a continuous polymerization for nine hours. The weight of polymer in the reactor at the end of the first nine hours was estimated to be approximately 3,500 g. which represents about 70% conversion. This estimation was reasonably accurate since a pressure drop occurred at 9 hours and it is known that at a pressure drop the conversion of vinyl chloride is approximately 70%. The total weight of polymer obtained at the completion of the experiment was 10,390 g. of which 3,500 of polymer was formed during the first 9 hours of batch polymerization. The difference, 6,890 g., represents the amount of polymer that was formed in the continuous system in 9 hours. The rate of polymerization during this latter nine hours was 1.97 times (6890/3500) greater than the rate obtained during the first 9 hours of batch polymerization. This example shows that continuous polymerization will serve to double the yield of polymer in a given period of time.

The table indicates that as polymerization progresses, the particle size of the resin increases. The phenomenon of increasing particle size with extent of conversion indicates that most of the incrementally charged monomer polymerizes in the polymer particles. The table, also, indicates that some of the charged monomer does form new particles, since the percentage of particles on and through the 200 mesh sieve remains substantially constant. This polyvinyl chloride polymer obtained at about 70% conversion is a very good general purpose calender grade resin.

EXAMPLE II

The method of this example was similar to that of Example I, above, except as noted herein. 6,000 grams of monomeric vinyl chloride were mixed with 12,000 grams of $H_2O$, 18 grams of polyvinyl alcohol (colloid) and 6 grams of lauroyl peroxide (catalyst) in a reactor equipped with a stirrer. The vinyl chloride was reacted at about 131° F. and 115 p.s.i.g. with stirring. The batch was reacted to 60% conversion of monomeric vinyl chloride to polymeric vinyl chloride when approximately 4500–5000 grams of the reaction mixture of polyvinyl chloride, monomeric vinyl chloride, water and colloid and catalyst residues were withdrawn. There was then fed into the reactor fresh monomeric vinyl chloride, water, colloid and catalyst in the same ratio as initially charged and sufficient to replace the total of vinyl chloride (monomer and polymer) withdrawn. The reaction was run for a total of 105 hours and every 2 hours similar withdrawals of polymeric mixture were made at 60% conversion while the reactor was continuously replenished with fresh monomeric mixture. The overall rate of conversion was about 6.67% by weight of polymer per hour for 105 hours for this continuous process whereas when using a batch system the conversion was about 4.3% by weight of polymer per hour for 105 hours. Moreover, the time for the batch system did not include time for discharging and filling the reactor but only the actual time of reaction in the reactor. Moreover, examination of the polymer prepared by the process of this invention showed that the number of fish eyes did not increase with the time of reaction.

The viscosities and particle sizes of some of the samples obtained at various periods of time during the continuous reaction are shown below:

| Sample No. | ($\eta$) | Particle Size (USS Screen Size) | | | |
|---|---|---|---|---|---|
| | | On 40 Mesh | On 100 Mesh | On 200 Mesh | Through 200 Mesh |
| 1 | 1.03 | 1 | 28 | 32 | 38 |
| 3 | 1.02 | | | | |
| 4 | 1.02 | | | | |
| 5 | .98 | 5 | 22 | 33 | 40 |
| 6 | 1.01 | | | | |
| 7 | 1.06 | | | | |
| 8 | 1.05 | | | | |
| last | 1.08 | 1 | 31 | 39 | 29 |

$\eta$=intrinsic viscosity in cyclohexanone at about 25° C.

The above data show that at about 60% conversion, the particle sizes of the polymeric particles do not substantially grow with time of polymerization during the continuous process.

EXAMPLE III

The monomer charge mixture of this example was similar to Example I, above, except that three autoclaves or reactors 1, 2 and 3 as shown in the accompanying drawing were used. In this method, as illustrated by the flow diagram of the drawing, reactors 1, 2 and 3 are charged with a vinyl chloride suspension recipe. Polymerization of the mixture in reactor 3 starts at 0 hour and at 6 hours the monomer mixtures in reactors 1 and 2 start polymerizing. At the end of 20 hours, reactor 3 will have reached about 86% conversion and reactors 1 and 2 will have reached about 70% conversion. At this time constant volume pumps 4 and 5 leading to reactors 1 and 2 from the general source of supply, 6, or feed tank or tanks are started. Pumps 4 and 5 deliver a reaction mixture similar that shown in Example I, above, through lines 4a and 5a to reactors 1 and 2. The conditions for reactors 1 and 2 are chosen at 70% conversion because at this rate the polymerization is at a maximum, whereas in reactor 3 the condition is chosen so that the monomer recovery load on the compressors is not excessive. At 86% conversion for reactor 3 the rate of conversion is approximately 4.6% per hour and this rate is desirable to operate the system shown in the drawing. Reactors 1 and 2 are in excess of their equilibrium vapor pressure and are filled whereas reactor 3 is not a filled reactor, this reactor is about 80% full and the volume in reactor 3 is maintained essentially constant. Float 7 connected through lever means 8 and diaphragm 8a and line 8b to diaphragm 8c serves to open and close valve 9 from reactor 3 depending on the change in the level of the reaction mixture in reactor 3 and this level controller arrangement thus serves to keep a constant level in reactor 3. Reactor 3 is connected through conduits or lines 11, 12 and 13 to pressure responsive diaphragms 14 and 15 of valves 16 and 17 of reactors 1 and 2 respectively. The pressure in reactors 1 and 2 should be about 150 p.s.i.g. at all times while the pressure in reactor 3 should be about 45 p.s.i.g. at all times. If the pressure in reactor 3 increases, the pressure through the lines 11—13 and diaphragms 14—15 serves to close partially or entirely valves 16 and 17 to slow or stop the delivery of a polymer-monomer slurry to reactor 3. If the pressure decreases in reactor 3, valves 16 and 17 will open to permit a greater flow into reactor 3. Pressure relief valve 18 is positioned between tank 6 and reactor 1. When the pressure in reactor 1 gets too high, this pressure relief valve will close and the monomer mixture will be returned to the feed tank or tanks 6 through line 19. Pressure relief valve 20 is similar to valve 18 and diverts the monomer mixture back to the feed tank through line 21 when the pressure in reactor 2 gets too high. It, thus, is seen that reactors 1, 2 and 3 are polymerizing at different rates and that as they reach maximum conversion, reactors 1 and 2, being at higher pressure than reactor 3, deliver a monomer, polymer, water etc. mixture to reactor 3 which is further polymerized and a portion of the reaction mixture is withdrawn from reactor 3, and monomer, water and polymer separated. With the process disclosed in this example and in the drawing, each reactor reaches about 86% conversion in about 20 hours. Therefore in 20 hours about 258 parts of polymer are formed in these three reactors. The overall rate of polymerization for a batch process using these three reactors separately is 258/20 which equals 12.9 parts per hour. On the other hand, the overall rate of polymerization in the continuous system as described herein and shown in the drawing using a system of 3 reactors is about 24.6 parts per hour, which is approximately double the rate obtained using a batch process.

While Example III shows a method involving three reactors it is apparent that the process will work with two reactors or more than three reactors. Moreover, a monomeric mixture as such need not be delivered by pumps 4 and 5 but separate feed lines for monomer, water and so forth may be instrumented to deliver the reaction ingredients separately to the reactors.

It is to be understood that in accordance with the provisions of the patent statutes the particular systems and procedures described and set forth are presented for purposes of explanation and illustration and that various modifications of said procedures and systems can be made without departing from the invention.

Having thus described the invention, what is claimed is:

1. A method for the suspension polymerization of unsaturated monomers at high rates of conversion which, free of a flowing inert gas, comprises delivering to a reaction zone a polymerizable monomer having from 1 to 3 $H_2C\!=\!C\!<$ groups, the polymer of said monomer being essentially insoluble in said monomer, in an amount of from about 5 to 50% by weight, about 95 to 50% by weight of water, and minor amounts of a catalyst to polymerize said monomer and protective colloid for said monomer, to form a mixture, polymerizing said monomer in said mixture in said reaction zone to a conversion of from about 40 to 90%, withdrawing from said reaction zone from about 1 to 60% by weight of a polymeric mixture of polymer, said monomer, water, colloid and catalyst residues, introducing into said reaction zone said monomer, water, catalyst and colloid to form a mixture substantially equivalent to the mixture originally in said reaction zone, the amount by weight of said monomer in said second monomeric mixture being substantially equivalent to the amount by weight of monomer and polymer in said polymeric mixture withdrawn from said reactor, polymerizing the monomer in the mixture in said reaction zone to a conversion of from about 40 to 90%, and repeatedly withdrawing polymeric mixture from said zone, adding monomer, water, catalyst and colloid to said zone and polymerizing the monomer in the mixture in said zone to obtain increased yields of said polymer, the conversion of said monomer to said polymer being maintained at a substantially constant rate within the said ranges of from about 40 to 90% during the overall polymerization of said monomer to said polymer.

2. A method according to claim 1 in which there additionally is introduced into said reaction zone from about 10 to 20% by weight based on the weight of said monomer of finely divided water insoluble particles of a polymeric material selected from the group consisting of resins and rubbers.

3. A method according to claim 2 in which about 50% by weight of said particles are retained on a 200 mesh U.S.S. screen and about 50% pass through a 200 mesh U.S.S. screen.

4. A method according to claim 3 in which said polymerizable monomer is vinyl chloride.

5. The method for suspension polymerizing a vinyl halide monomer at high rates of conversion which, free of a flowing inert gas, comprises introducing into a reaction zone a mixture containing from about 25 to 50% by weight of a polymerizable material of a predominating amount of a monomer having the formula $$CH_2=\underset{X}{\overset{H}{C}}$$

where X is selected from the group consisting of fluorine, chlorine and bromine radicals, from about 75 to 50% by weight of water and minor amounts of a protective colloid for said monomer and a catalyst to polymerize said monomer and sufficient to maintain a suspension polymerization system and to catalyze the polymerization reaction, polymerizing said mixture at a pressure of from about 90 to 160 p.s.i.g. and at a temperature from about 120 to 150° F. to a conversion of from about 55 to 70%, withdrawing from said reaction zone from about 1 to 30% by weight of a suspension comprising a polymer of said monomer, said monomer, water, colloid and catalyst, introducing into said reaction zone a fresh mixture of a polymerizable monomer having a composition essentially the same as initially introduced into said reaction zone, and containing said monomer in an amount by weight essentially equivalent to the amount by weight of said polymer and said monomer withdrawn from said reaction zone, continuing said polymerization in said reaction zone to a conversion of from about 55 to 70%, withdrawing a polymeric-monomeric aqueous suspension from said reaction zone, adding a fresh aqueous mixture of said monomer to said reaction zone and polymerizing said monomer in said reaction zone to obtain substantial increases in the total yield of said polymer, the conversion of said monomer to said polymer being maintained at a substantially constant rate within the said ranges of from about 55 to 70% during the overall polymerization of said monomer to said polymer.

6. The method for suspension polymerizing a vinyl halide monomer which, free of a flowing inert gas, comprises introducing into a reaction zone a mixture containing about 33% by weight of a polymerizable material of a predominating amount of a monomer having the formula $$CH_2=\underset{X}{\overset{H}{C}}$$

where X is selected from the group consisting of fluorine, chlorine and bromine radicals, about 67% by weight of water and minor amounts of a catalyst to polymerize said monomer and a protective colloid for said monomer and sufficient to catalyze said reaction and to maintain said suspension, polymerizing said material at a temperature of from about 120 to 150° F. and at a pressure of from about 90 to 160 p.s.i.g. in said reaction zone, continuously withdrawing a portion of the reaction mixture containing polymer, monomer and water when the pressure drops and at about 60 to 70% conversion, continuously introducing into said reaction zone a fresh mixture of essentially the same compostion as initially introduced into said reaction zone and containing said monomer in an amount by weight essentially equivalent to the amount by weight of said polymer and said monomer withdrawn from said reaction zone, continuing to polymerize said monomer under said polymerizing conditions, continuously withdrawing polymeric mixture at about 60 to 70% conversion when the pressure drops, adding fresh monomeric mixture, polymerizing and withdrawing polymeric mixture to obtain substantial increases in the total yield of said polymer, the conversion of said monomer to said polymer being maintained at a substantially constant rate within the said ranges of from about 60 to 70% during the overall polymerization of said monomer to said polymer.

7. The method according to claim 6 in which said polymerizable material is vinyl chloride.

8. The method according to claim 6 in which said polymerizable material comprises a mixture of from about 86 to 98% by weight of vinyl chloride and from about 14 to 2% by weight of vinyl acetate.

9. A method for the suspension polymerization of a monomer which, free of a flowing inert gas comprises delivering water, a polymerizable unsaturated monomer, the polymer obtained from said monomer being essentially insoluble in said monomer, a catalyst to polymerize said monomer, and a protective colloid for said monomer to a first named reactor to fill the same, delivering a similar mixture to a second named reactor to partially fill the same, polymerizing the mixture in said second named reactor to substantial conversion and to obtain a drop in pressure, after appreciable polymerization in said second named reactor polymerizing the mixture in said first named reactor without a substantial drop in pressure, continuously removing a slurry of polymer, monomer and water from said second named reactor, continuously forcing a slurry of polymer, monomer and water from said first named reactor to said second named reactor due to the difference in pressures in said reactors, and as said slurry is withdrawn from said second named reactor, continuouly introducing a fresh mixture of said polymerizable monomer, water, catalyst and colloid into said first named reactor to continuously maintain a constant composition in the system while continuously withdrawing a polymer slurry from the same and while polymerizing said monomer, the conversion of said monomer to said polymer being maintained at a substantially constant rate during the overall polymerization of said monomer to said polymer.

10. A system for the continuous aqueous suspension polymerization of polymerizable unsaturated monomers comprising a first named pressure reactor, a second named pressure reactor, pressure responsive means for controlling the flow of aqueous slurry from said first named reactor to said second named reactor, discharge means attached to said second named reactor for removing an aqueous slurry of polymer, monomer and water from said second named reactor, means in said second named reactor to maintain a substantially constant level of material in said second named reactor and to control the rate of flow through said discharge means, delivery means to deliver polymerizable monomer, water, catalyst to polymerize said monomer and colloid for said monomer to said first named reactor, and means responsive to pressure in said first named reactor to control the rate of flow of monomer, water, catalyst to polymerize said monomer and colloid for said monomer from said delivery means to said first named reactor, to maintain a substantially constant composition and to maintain a substantially constant rate of conversion of monomer to polymer in said system while withdrawing polymer, monomer and water from said system during polymerization.

References Cited in the file of this patent

UNITED STATES PATENTS

| | | |
|---|---|---|
| 2,694,700 | Shanta | Nov. 16, 1954 |
| 3,007,903 | Stark | Nov. 7, 1961 |